(12) United States Patent
Malinin et al.

(10) Patent No.: US 9,559,597 B2
(45) Date of Patent: Jan. 31, 2017

(54) DETECTING OPEN CONNECTION OF AUXILIARY WINDING IN A SWITCHING MODE POWER SUPPLY

(71) Applicants: Dialog Semiconductor Inc., Campbell, CA (US); Dialog Semiconductor (UK) Limited, Reading (GB)

(72) Inventors: Andrey Malinin, Fort Collins, CO (US); Tino Lin, Taipei (TW); Jiandong Zhang, Sunnyvale, CA (US); John Kesterson, Seaside, CA (US); Qiu Sha, Cupertino, CA (US)

(73) Assignees: Dialog Semiconductor Inc., Campbell, CA (US); Dialog Semiconductor (UK) Limited, Reading (GB)

(*) Notice: Subject to any disclaimer, the term of this patent is extended or adjusted under 35 U.S.C. 154(b) by 0 days.

(21) Appl. No.: 14/634,564

(22) Filed: Feb. 27, 2015

(65) Prior Publication Data
US 2016/0254753 A1    Sep. 1, 2016

(51) Int. Cl.
*H02M 3/335* (2006.01)

(52) U.S. Cl.
CPC ................ *H02M 3/33507* (2013.01)

(58) Field of Classification Search
CPC ............ H02M 1/32; H02M 2001/0032; H02M 2001/0048
See application file for complete search history.

(56) References Cited

U.S. PATENT DOCUMENTS

| | | | | |
|---|---|---|---|---|
| 5,995,384 | A * | 11/1999 | Majid | H02M 3/33523 323/902 |
| 2004/0257839 | A1* | 12/2004 | Yang | H02M 3/33507 363/21.12 |
| 2005/0259455 | A1* | 11/2005 | Mori | H02M 3/33507 363/123 |
| 2005/0285587 | A1* | 12/2005 | Yang | H02M 3/33507 324/103 P |
| 2006/0034102 | A1* | 2/2006 | Yang | H02M 3/33507 363/21.13 |

(Continued)

FOREIGN PATENT DOCUMENTS

DE        698 01 980 T2    2/1999

OTHER PUBLICATIONS

German Office Action, German Application No. 102015206264.3, Jan. 20, 2016, 11 pages.

(Continued)

*Primary Examiner* — Timothy J Dole
*Assistant Examiner* — Yusef Ahmed
(74) *Attorney, Agent, or Firm* — Fenwick & West LLP

(57) ABSTRACT

A power converter has a transformer including a primary winding coupled to an input voltage, a secondary winding coupled to an output of the power converter, and an auxiliary winding is configured to detect an open connection fault of the auxiliary winding. The power converter includes a current source coupled to the auxiliary winding that, when activated, supplies a current to the auxiliary winding. A controller measures a voltage across the auxiliary winding. Responsive to detecting an increase in the voltage across the auxiliary winding while the current source is activated, the controller disables the power converter.

16 Claims, 4 Drawing Sheets

(56) References Cited

U.S. PATENT DOCUMENTS

| | | | |
|---|---|---|---|
| 2006/0056204 A1* | 3/2006 | Yang | H02M 3/33507 363/10 |
| 2006/0077697 A1* | 4/2006 | Yang | H02M 3/33507 363/21.13 |
| 2006/0093017 A1* | 5/2006 | Gong | H02M 3/33507 375/134 |
| 2007/0153439 A1* | 7/2007 | Matyas | H02M 3/33507 361/90 |
| 2008/0067994 A1* | 3/2008 | Kesterson | H02M 3/33507 323/283 |
| 2008/0192515 A1* | 8/2008 | Huynh | H02M 3/33507 363/21.12 |
| 2010/0225293 A1* | 9/2010 | Wang | H02M 3/33507 323/290 |
| 2011/0075450 A1* | 3/2011 | Shimada | H02M 1/36 363/21.18 |
| 2011/0182088 A1* | 7/2011 | Lidak | H02M 3/33507 363/21.12 |
| 2011/0227506 A1* | 9/2011 | Ren | H02M 3/33507 315/307 |
| 2011/0261596 A1* | 10/2011 | Zong | H02M 3/33507 363/21.13 |
| 2012/0056551 A1* | 3/2012 | Zhu | H02M 1/4258 315/232 |
| 2012/0081039 A1* | 4/2012 | Yang | H05B 33/0815 315/307 |
| 2013/0051088 A1* | 2/2013 | Yamashita | H02M 1/36 363/21.13 |
| 2013/0343095 A1* | 12/2013 | Zhu | H02M 1/4258 363/21.01 |
| 2014/0160802 A1 | 6/2014 | Zhang et al. | |
| 2014/0185333 A1* | 7/2014 | Yang | H02M 3/33569 363/21.12 |
| 2014/0210377 A1* | 7/2014 | Knoedgen | H02M 3/33507 315/307 |
| 2014/0355314 A1* | 12/2014 | Ryan | H02M 3/33507 363/21.01 |
| 2015/0070945 A1* | 3/2015 | Huang | H02H 7/1213 363/21.16 |

OTHER PUBLICATIONS

Verhees, H. et al., "Application Note—A Printer Adapter Power Supply for 90 Watt Peak with TEA1532-AN10316_1," Koninklijke Philips Electronics N.V., 2004, 50 pages, [Online] [Retrieved on Feb. 10, 2014], Retrieved from the Internet<URL:http://www.nxp.com/documents/application_note/AN10316.pdf>.

* cited by examiner

DETECTING OPEN CONNECTION OF AUXILIARY WINDING IN A SWITCHING MODE POWER SUPPLY

BACKGROUND

This disclosure relates generally to a switching power supply and more particularly to detecting open connection faults of an auxiliary winding in a switching mode power supply.

Many electronic devices, including smart phones, tablets, and portable computers, employ power supplies providing controlled and regulated power output over wide operating conditions. These power supplies often include a power stage for delivering electrical power from a power source to a load across a transformer. A switch in the power stage electrically couples or decouples the load to the power source, and a switch controller coupled to the switch controls on-time and off-time of the switch. Regulation of the power output can be accomplished by, among other things, measuring the output current or output voltage and feeding that back to the primary-side switch controller. In order to improve cost performance and reduce size, many commercially available isolated power supplies employ primary-only feedback and control.

In power supplies using primary-side feedback and control, an auxiliary winding provides a feedback signal to the switch controller. By sensing primary side signals, the controller detects the secondary output and load conditions in order to control and regulate the output of the power supply. However, if the auxiliary winding is faulty or disconnected from the power supply, the switch controller does not receive an accurate feedback signal. Without an accurate feedback signal, the controller may not maintain operation of the power supply within overvoltage limits, resulting in possible damage to the power supply or a load driven by the power supply. It is therefore important to detect open connection faults of the auxiliary winding prior to using the auxiliary winding to provide feedback to the switch controller.

SUMMARY

A power converter is configured to detect open connection faults of an auxiliary winding, such as a disconnection of the auxiliary winding from the power converter or a manufacturing defect of the auxiliary winding. The power converter comprises a transformer including a primary winding coupled to an input voltage, a secondary winding coupled to an output of the power converter, and the auxiliary winding. Output voltage of the power converter is reflected as feedback across the auxiliary winding. A controller is coupled to the auxiliary winding and measures a voltage across the auxiliary winding. In one embodiment, the controller receives the feedback generated across the auxiliary winding and regulates the output of the power converter based on the received feedback.

A current source is coupled to the auxiliary winding. When activated, the current source supplies a current to the auxiliary winding. If the controller detects an increase in the voltage across the auxiliary winding while the current source is activated, the controller detects an open connection fault of the auxiliary winding and disables the power converter in response.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Embodiments of power converters described herein may be configured to detect open fault connections of an auxiliary winding providing feedback of an output of the power converters on a primary side of the power converters. As an open fault connection of the auxiliary winding, such as a disconnection of the auxiliary winding from the power converter or a manufacturing defect of the auxiliary winding, reduces the accuracy of the feedback signal, regulating output of the power converter based on the feedback signal generated across a faulty auxiliary winding may result in operation of the power converter outside of the specifications of the power converter or a load coupled to the power converter. Embodiments of a power converter therefore include a controller disabling the power converter in response to detecting an open connection fault.

Figure 1:
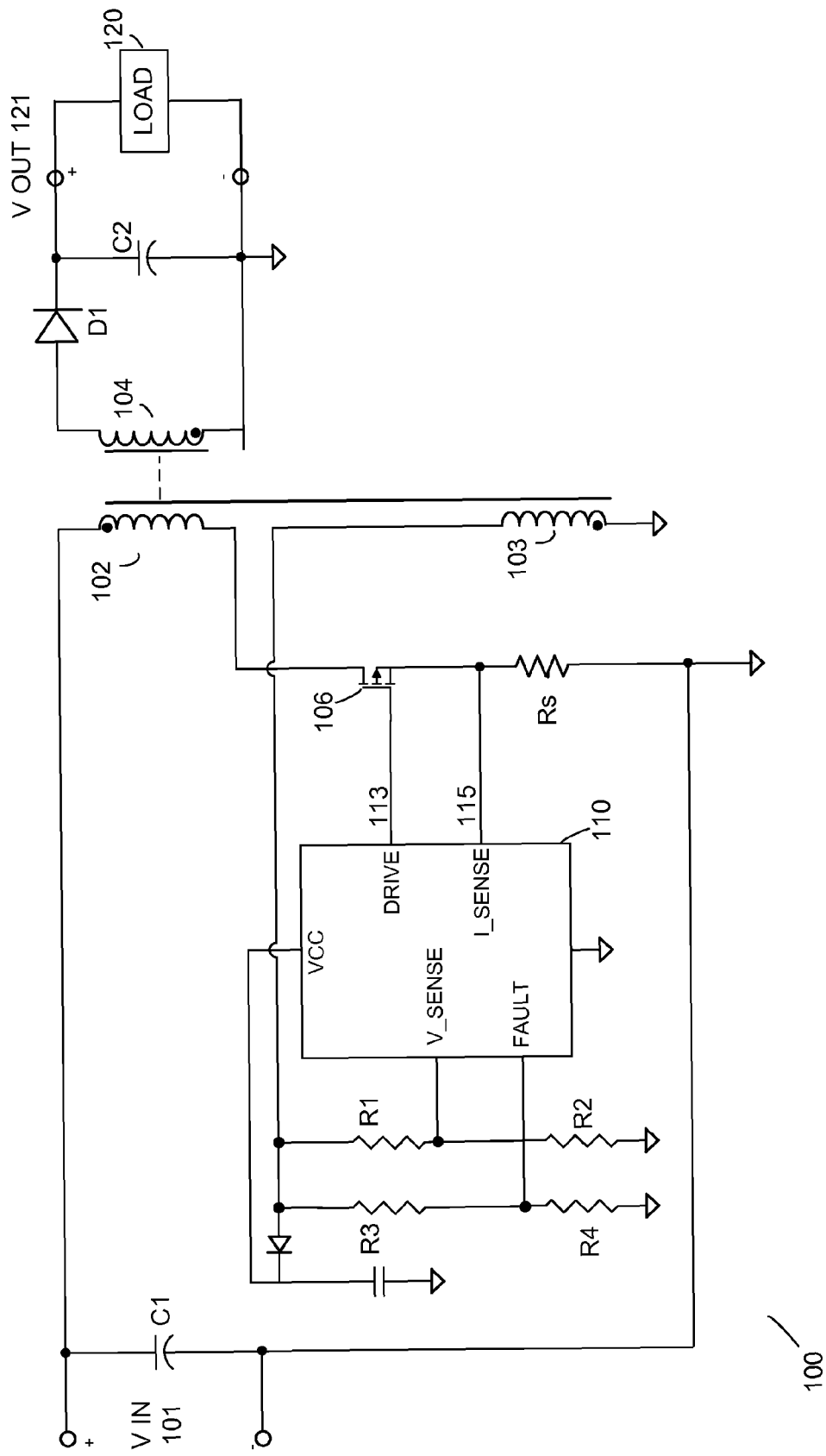
FIG. 1 illustrates a power converter, according to one embodiment.

FIG. 1 illustrates an example embodiment of a power converter 100 employing primary-side feedback and control. In one embodiment, the power converter 100 includes, among other components, a transformer with primary winding 102, secondary winding 104, and auxiliary winding 103, a power switch 106, and a controller 110.

Referring to FIG. 1, the power converter 100 receives AC power from an AC power source (not shown), which is rectified to provide the regulated DC input voltage 101 across the input capacitor C1. Input voltage 101 is coupled to the primary winding 102. During ON cycles of the power switch 106, energy is stored in the primary winding 102 because the rectifier $D_1$ is reverse biased. The energy stored in the primary winding 102 is released to the secondary winding 104 and transferred to the load 120 across the capacitor C2 during the OFF cycles of the power switch 106 because the rectifier $D_1$ becomes forward biased. After the power switch 106 turns off, the rectifier D1 conducts current to the output of the switching power converter 100.

The primary-side controller 110 generates a control signal 113 to turn on or turn off power switch 106. The controller 110 senses current I_sense through the primary winding 102 in the form of a voltage 115 across a sense resistor Rs. The current I_sense is proportional to the current through the load 120 by a turns ratio of the transformer. In one embodiment, the controller 110 also receives two feedback signals: a sensed voltage V_SENSE, which indicates the output voltage 121 of the power converter 100, and a fault detection signal FAULT, which indicates an overvoltage condition or other fault condition of the power converter 100. The feedback signals input to the controller 110 are generated by the voltage across the secondary winding 104 being reflected across the auxiliary winding 103 of the transformer during OFF cycles of the power switch 106. The voltage across the auxiliary winding 103 is divided by a first resistor divider including resistors R1 and R2 and input to the controller 110 as the sensed voltage V_sense indicative of the output voltage 121. The FAULT signal is generated by dividing the voltage across the auxiliary winding 103 by a second resistor divider including resistors R3 and R4. The combined resistance of resistors R1 and R2 and the combined resistance of resistors R3 and R4 are each greater than the resistance of the auxiliary winding 103 when the auxiliary winding 103 is connected to the power converter 100.

The controller 110 controls switching of the power switch 106 to regulate the output voltage 121 based on V_sense or to regulate output current through the load 120 based on I_sense. The controller 110 can employ any one of a number of modulation techniques, such as pulse-width-modulation (PWM) or pulse-frequency-modulation (PFM), to control the ON and OFF states and duty cycles of the power switch 106 to regulate the output voltage 121 and current through the load 120.

The controller 110 is configured to operate the switching power converter 100 during a variety of load conditions, including when a load (e.g., an electronic device) is connected to the power supply and when a load is not connected. For example, in a constant voltage mode, the controller 110 supplies a regulated DC output of a fixed voltage within a specified tolerance range. Constant voltage mode generally indicates that the internal battery of the electronic device is fully charged and the fixed voltage output of the power supply provides the operating power for the electronic device to be operated normally. In a constant current mode, the power supply provides a fixed current output. Constant current mode generally indicates that the internal battery of the electronic device is not fully charged and the constant current output of the power supply allows for the efficient charging of the internal battery of the electronic device. Lastly, in a no-load condition, the electronic device is disconnected from the power supply. Under the no-load condition, the controller 110 may maintain a regulated voltage output from the power converter 100 in anticipation of the load being reconnected to the power supply.

Under light-load or no-load conditions, controller 110 may operate in PFM and reduce the switching frequency of power switch 106 in order to maintain regulation of output voltage 121. As the switching frequency of power switch 106 decreases, the time between measurements of the sensed voltage V_sense due to the OFF cycles of the power switch 106 increases. If the load 120 increases between measurements, the output voltage 121 drops until V_sense is sensed again and the controller 110 responds to the load change.

The controller 110 is also configured to monitor fault conditions based on the fault detection signal, and disable the power converter 100 responsive to detecting a fault condition. For example, if the controller 110 detects the output voltage 121 has increased above an overvoltage threshold value, the controller 110 disables the power converter 100 to reduce the possibility of damage to the power converter 100 or the load 120.

Thus, the controller 110 regulates the output voltage 121 based on the feedback voltage generated across the auxiliary winding 103. If a connection of the auxiliary winding 103 to the power converter 100 is faulty (e.g., the auxiliary winding 103 is disconnected from the power converter 100), the controller 110 does not receive an accurate feedback signal and therefore does not properly regulate the output voltage 121. To verify the auxiliary winding 103 is properly connected, the controller 110 performs a verification process during a startup sequence of the power converter 100. If the verification process reveals the auxiliary winding 103 to be disconnected or improperly connected, the controller 110 disables the power converter 100.

Figure 2:
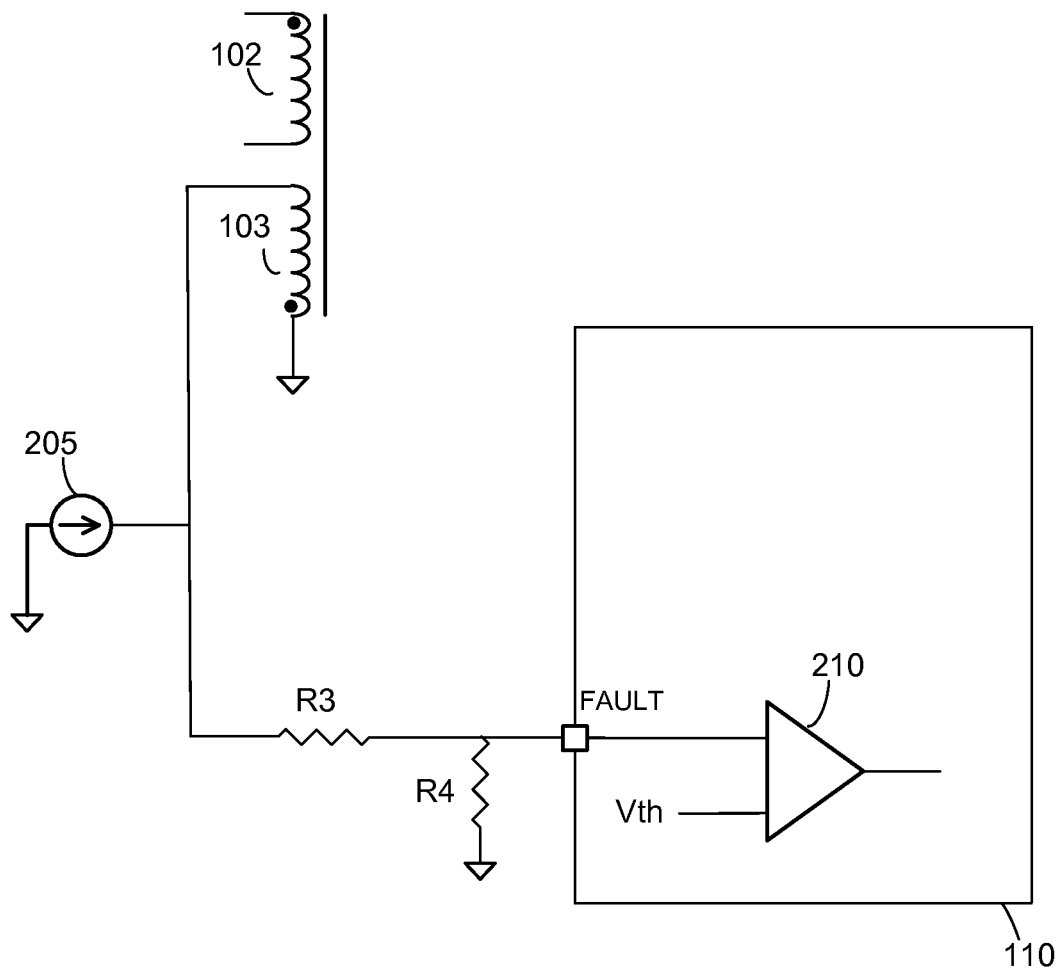
FIG. 2 is a block diagram of a power converter configured to detect open connection faults, according to one embodiment.

FIG. 2 is a block diagram illustrating an example embodiment of the power converter 100 configured to detect an open connection fault of the auxiliary winding 103. As shown in FIG. 2, the power converter 100 includes a current source 205 coupled between the auxiliary winding 103 and the controller 110. When activated, the current source 205 supplies a current to the auxiliary winding 103. Since the effective resistance of the auxiliary winding 103 is low when the auxiliary winding 103 is connected to the power converter 100, the voltage generated across a connected auxiliary winding 103 while the current source 205 is activated is low. In contrast, because the effective resistance of the auxiliary winding 103 is high when the auxiliary winding 103 is not properly connected, the voltage generated across a faulty auxiliary winding 103 while the current source 205 is activated is high.

In one embodiment, the controller 110 measures a voltage across resistor R4 to detect open connections at the auxiliary winding 103. The voltage across resistor R4 is input to a comparator 210, which compares the voltage to a threshold voltage Vth. If the voltage across resistor R4 is greater than the threshold voltage Vth during the verification process, the controller 110 determines the connection of the auxiliary winding 103 to the power converter 100 is faulty and disables the power converter 100. In contrast, if the comparator 210 does not detect an increase in the voltage across resistor R4 during the verification process, the controller 110 determines the auxiliary winding 103 is connected to the power converter 100 and continues normal operation of the power converter 100.

Figure 3:
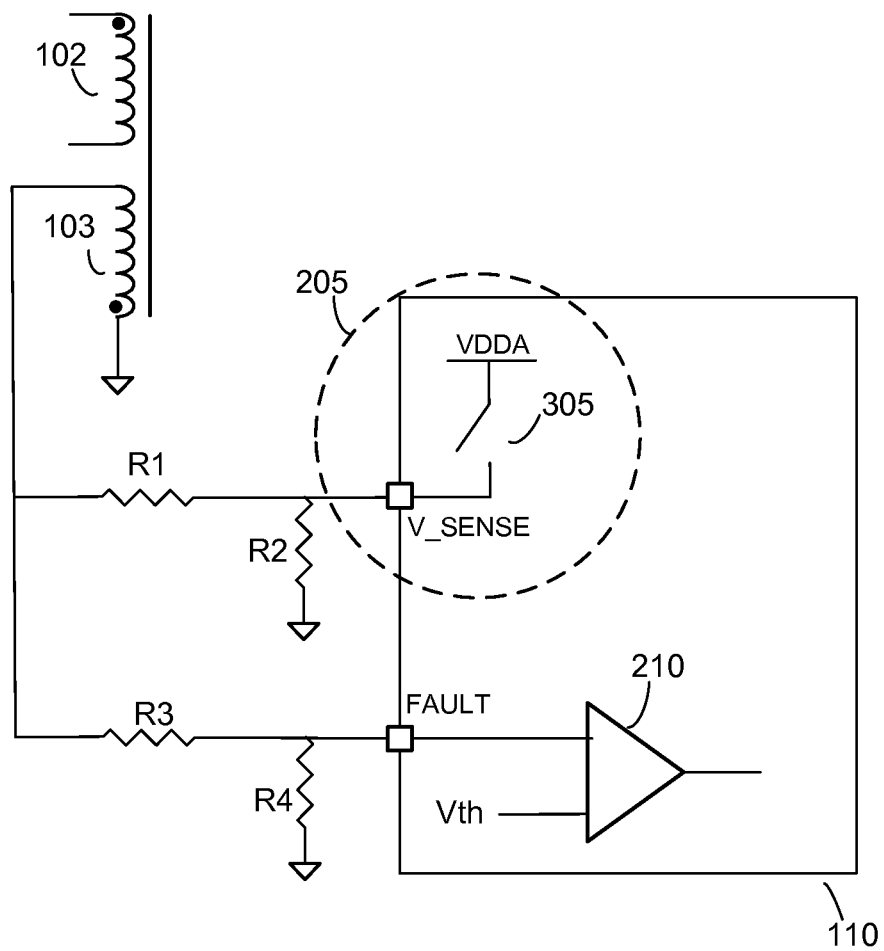
FIG. 3 is a block diagram of a power converter configured to detect open connection faults, according to another embodiment.

The current source 205 supplying current to the auxiliary winding 103 to detect open connections of the auxiliary winding 103 may be any current source within the power converter 100. In one embodiment, as shown in FIG. 3, the controller 110 includes the current source 205. In the embodiment illustrated in FIG. 3, the current source 205 includes a switch 305 coupled to a voltage source within the controller 110, such as a voltage VDDA supplying voltage to internal components of the controller 110. The controller 110 activates the switch 305 to verify the auxiliary winding 103 is connected to the power converter 100. After verifying the connection of the auxiliary winding 103 to the power converter 100 (e.g., if the controller 110 does not detect an increase in the voltage across the auxiliary winding 103), the controller 110 turns off the switch 305 to resume normal operation of the power converter 100.

Figure 4:
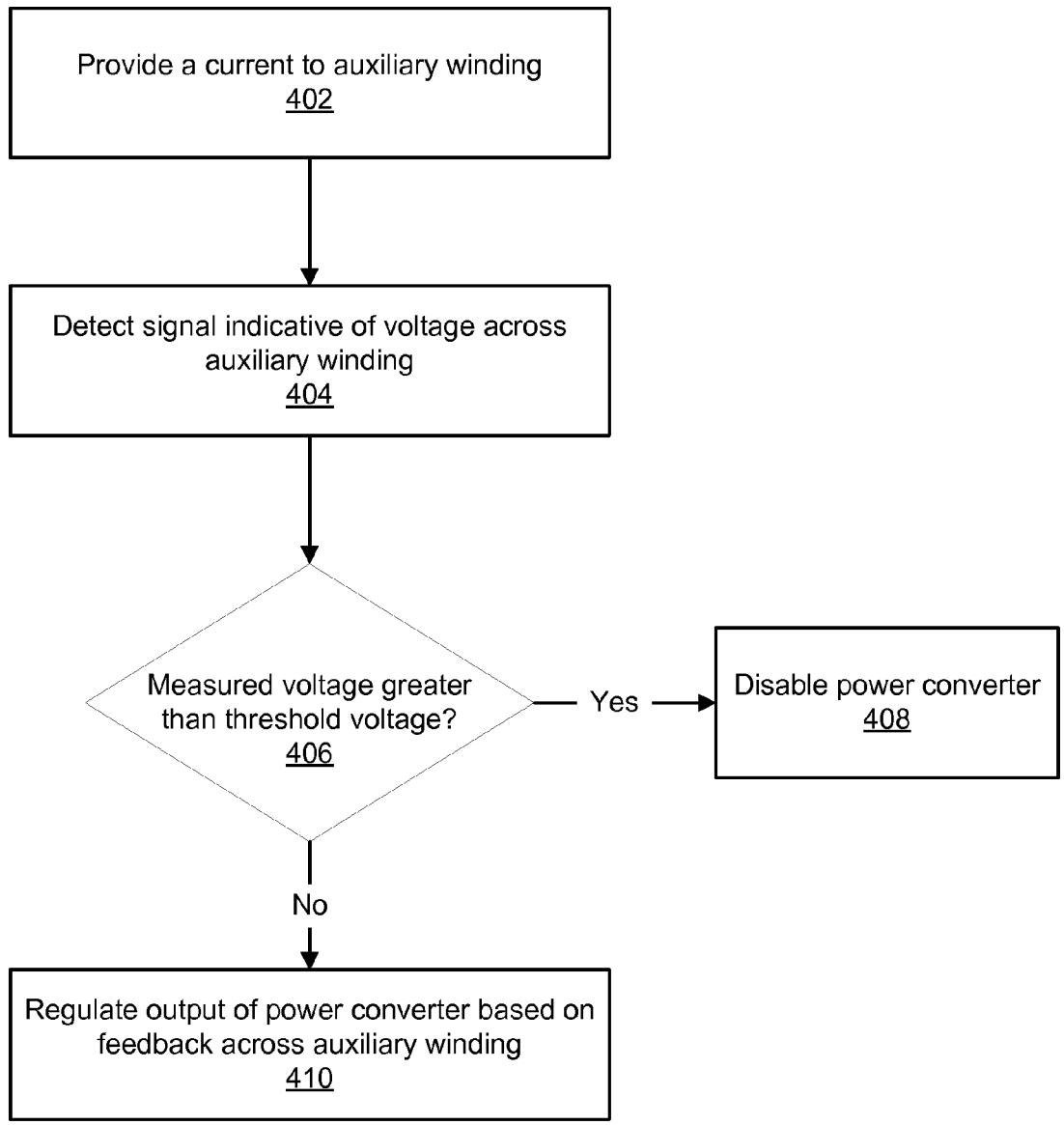
FIG. 4 is a flowchart illustrating a process for detecting open connection faults, according to one embodiment.

FIG. 4 is a flowchart illustrating a verification process 400 for detecting open connection faults of the auxiliary winding 103 in a primary-side feedback and control power converter 100. The process 400 may be performed during a startup sequence of the power converter 100, for example when the power converter 100 is connected to an AC power source. In one embodiment, the steps of the process 400 are performed by the controller 110, which is configured to receive feedback from the auxiliary winding 103 and regulate output of the power converter 100 based on the feedback.

The controller 110 provides 402 a current to the auxiliary winding 103. In one embodiment, the controller 110 provides 402 the current by activating the current source 205. For example, the controller 110 turns on the switch 305 coupled to an internal voltage source VDDA of the controller 110. When activated, the current source 205 provides a current to the auxiliary winding 103.

The controller 110 detects 404 a signal indicative of a voltage across the auxiliary winding 103 (e.g., a signal indicating a voltage across the resistor R4), measures the voltage of the detected signal, and compares 406 the measured voltage to a threshold voltage Vth. In one embodiment, the controller 110 detects 404 the signal indicative of the voltage across the auxiliary winding 103 for a specified period of time after activating the current source 205, such as 10 milliseconds. If the measured voltage is greater than the threshold voltage Vth while the current source 205 is activated, the controller 110 disables 408 the power converter 100. If the measured voltage is less than the threshold voltage Vth while the current source 205 is activated, the controller 110 continues normal operation of the power converter 100 by regulating 410 output of the power converter 100 based on the feedback signal generated across the auxiliary winding 103.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

Upon reading this disclosure, those of skill in the art will appreciate still additional alternative designs for the system. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in any claims drawn to the subject matter herein.

What is claimed is:

1. A power converter comprising:
    a transformer including a primary winding coupled to an input voltage, a secondary winding coupled to an output of the power converter, and an auxiliary winding, output voltage of the power converter being reflected as feedback across the auxiliary winding;
    a current source coupled to the auxiliary winding, the current source when activated supplying a current to the auxiliary winding; and
    a controller regulating the output voltage of the power converter based on the feedback across the auxiliary winding, the controller adapted to measure a voltage across the auxiliary winding while the current source is activated and disable the power converter responsive to detecting the voltage across the auxiliary winding is greater than a threshold voltage while the current source is activated.

2. The power converter of claim 1, further comprising:
    a comparator receiving the voltage across the auxiliary winding and comparing the received voltage to the threshold voltage.

3. The power converter of claim 1, wherein the current source is an output of the controller.

4. The power converter of claim 3, wherein the current source comprises a switch coupled to a voltage source of the controller, and wherein the controller turns on the switch to activate the current source and turns off the switch to deactivate the current source.

5. The power converter of claim 3, wherein the controller activates the current source during a startup sequence of the power converter.

6. The power converter of claim 1, further comprising:
    a switch coupled to the primary winding of the transformer, current in the primary winding being generated responsive to the switch being turned on and not generated responsive to the switch being turned off;
    wherein the controller generates a signal to control switching of the switch based on the feedback across the auxiliary winding.

7. The power converter of claim 6, wherein the controller generates the signal to control switching of the switch responsive to not detecting the increase in the voltage across the auxiliary winding while the current source is activated.

8. The power converter of claim 1, wherein the controller receives the feedback from the auxiliary winding.

9. A method for detecting an open connection fault of an auxiliary winding of a power converter, the power converter including a controller and a transformer with a primary winding coupled to an input voltage, a secondary winding coupled to an output of the switching power converter, and the auxiliary winding, output voltage of the power converter being reflected as feedback across the auxiliary winding, the method comprising:
    providing a current to the auxiliary winding;
    detecting a signal indicative of a voltage across the auxiliary winding while the current is provided to the auxiliary winding; and
    responsive to the detected signal indicating the voltage across the auxiliary winding is greater than a threshold voltage while the current is provided to the auxiliary winding, disabling the power converter.

10. The method of claim 9, further comprising:
    comparing the voltage across the auxiliary winding to the threshold voltage.

11. The method of claim 9, wherein the current is provided by the controller.

12. The method of claim 11, wherein a current source providing the current to the auxiliary winding comprises a switch coupled to a voltage source of the controller, and wherein providing the current comprises turning on the switch.

13. The method of claim 9, wherein the current is provided to the auxiliary winding during a startup sequence of the power converter.

14. The method of claim 9, wherein the power converter further comprises a switch coupled to the primary winding of the transformer, current in the primary winding being generated responsive to the switch being turned on and not generated responsive to the switch being turned off, and wherein the controller generates a signal to control switching of the switch based on the feedback across the auxiliary winding.

15. The method of claim 14, further comprising:
   responsive to the detected signal not indicating the increase in the voltage across the auxiliary winding while the current is provided to the auxiliary winding, generating the signal to control switching of the switch.

16. The method of claim 9, further comprising receiving the feedback from the auxiliary winding.

* * * * *